(12) United States Patent
Luc

(10) Patent No.: US 11,045,995 B2
(45) Date of Patent: Jun. 29, 2021

(54) DEVICE AND METHOD FOR MANUFACTURING RECEPTACLES PROVIDED WITH DECORATIVE WRAP-AROUND LABELS BY THERMOFORMING

(71) Applicant: ERCA, Les Ulis (FR)

(72) Inventor: Michel Luc, Chaumes-en-brie (FR)

(73) Assignee: ERCA, Les Ulis (FR)

( * ) Notice: Subject to any disclaimer, the term of this patent is extended or adjusted under 35 U.S.C. 154(b) by 621 days.

(21) Appl. No.: 15/571,124

(22) PCT Filed: May 6, 2016

(86) PCT No.: PCT/FR2016/051071
§ 371 (c)(1),
(2) Date: Nov. 1, 2017

(87) PCT Pub. No.: WO2016/177986
PCT Pub. Date: Nov. 10, 2016

(65) Prior Publication Data
US 2018/0169928 A1 Jun. 21, 2018

(30) Foreign Application Priority Data
May 7, 2015 (FR) ...................... 1554138

(51) Int. Cl.
| B29C 51/30 | (2006.01) |
| B29C 51/16 | (2006.01) |
| B29L 31/00 | (2006.01) |
| B29C 51/10 | (2006.01) |
| B29C 51/04 | (2006.01) |
| B29C 51/22 | (2006.01) |
| B29C 51/06 | (2006.01) |

(52) U.S. Cl.
CPC .......... B29C 51/167 (2013.01); B29C 51/165 (2013.01); B29C 51/30 (2013.01);
(Continued)

(58) Field of Classification Search
CPC ..... B29C 51/167; B29C 51/165; B29C 51/30; B29C 51/303; B29C 51/04; B29C 51/06; B29C 51/10; B29C 51/22; B29C 51/225
(Continued)

(56) References Cited

FOREIGN PATENT DOCUMENTS

| CN | 1729125 A | 2/2006 |
| CN | 102039668 A | 5/2011 |

(Continued)

OTHER PUBLICATIONS

English abstractor FR2986176 (Year: 2013).*
(Continued)

*Primary Examiner* — Jeffrey M Wollschlager
*Assistant Examiner* — Xue H Liu
(74) *Attorney, Agent, or Firm* — Eversheds Sutherland (US) LLP

(57) ABSTRACT

The device includes a mold block having at least one thermoforming chamber (28) having an inside surface (29), an axial opening (28A) through which a decorative wrap-around label (38) can be inserted into the chamber, and a moving end-wall (40) opposite from the opening. The end-wall is suitable for moving in an end segment (28A) of the chamber (28) between a positioning high level and at least one thermoforming low level, and the device has at least one tongue-and-groove set comprising a fin (42) on the end-wall (40) that is engaged in a notch (44) in the inside surface of the end segment (28B).

10 Claims, 5 Drawing Sheets

(52) U.S. Cl.
CPC ............ *B29C 51/303* (2013.01); *B29C 51/04* (2013.01); *B29C 51/06* (2013.01); *B29C 51/10* (2013.01); *B29C 51/22* (2013.01); *B29C 51/225* (2013.01); *B29L 2031/7132* (2013.01); *B29L 2031/7136* (2013.01)

(58) Field of Classification Search
USPC ........................................................ 264/522
See application file for complete search history.

(56) References Cited

FOREIGN PATENT DOCUMENTS

| | | | |
|---|---|---|---|
| CN | 103796813 A | 5/2014 | |
| CN | 104093543 A | 10/2014 | |
| DE | 10 2012 204511 A1 | 9/2013 | |
| EP | 0 132 776 A2 | 2/1985 | |
| FR | 2 340 185 A2 | 9/1977 | |
| FR | 2 342 145 A1 | 9/1977 | |
| FR | 2 528 349 A1 | 12/1983 | |
| FR | 2986176 A1 * | 8/2013 | ............ B29C 51/04 |
| WO | 2010-125536 A1 | 11/2010 | |

OTHER PUBLICATIONS

Office Action issued in Chinese Patent Application No. 2016800264878, dated Apr. 30, 2019, 8 pages.
International Search Report dated May 8, 2016.
Written Opinion.

* cited by examiner

DEVICE AND METHOD FOR MANUFACTURING RECEPTACLES PROVIDED WITH DECORATIVE WRAP-AROUND LABELS BY THERMOFORMING

CROSS-REFERENCE TO RELATED APPLICATIONS

This application is a continuation of International Application No. PCT/FR2016/051071, filed May 6, 2016, which claims priority to French patent application 1554138, filed May 7, 2015, both of which are incorporated by reference.

The present description relates to a device for manufacturing receptacles provided with decorative wrap-around labels or "banderoles" by thermoforming, the device including a mold block having at least one thermoforming chamber that has an inside surface, an axial opening, and a moving end-wall, opposite from the opening.

Devices of the above-mentioned type are also known from Documents FR 2 340 185, FR 2 342 145, and FR 2 528 349, those devices having a wrap-around label insertion block disposed on the other side of the mold block relative to the axial opening, for the purpose of inserting wrap-around labels via the end-wall of the thermoforming chamber, which end-wall is provided with an insertion slot or the like for that purpose. Those known devices have particular mechanisms, and they are adapted to particular configurations, making it possible to convey wrap-around labels under the mold block and having sufficient clearance under the mold block.

The present description relates to a device including a wrap-around label insertion block having at least one wrap-around label insertion chamber and a piston mounted to move in the wrap-around label insertion chamber to push a decorative wrap-around label into the thermoforming chamber through said axial opening.

In particular, the axial opening also serves for inserting thermoplastic material into the chamber during the thermoforming.

A device of this type is known from Patent EP 2 621 708. In that known device, an end-wall portion is mounted to move between a wrap-around label positioning position in which it forms, inside the chamber, a shoulder suitable for receiving the lower end of a wrap-around label put in place in the chamber so as to define the position of said wrap-around label clearly, and a thermoforming position, in which said shoulder is retracted. In that prior patent, the end-wall portion is formed by two parts mounted to move back and forth transversely relative to thermoforming direction. That device is satisfactory, but its mechanism is relatively complex due to the need to move the two portions of the end-wall transversely to the thermoforming direction, i.e. to the direction in which the other movements generally take place.

Another device of the above-mentioned type is known from Patent FR 2 986 176. In that document, the device includes a moving mold end-wall part and at least one retractable member. That moving mold end-wall part moves, in the thermoforming direction, between a closed position in which it is closed against the main body of said chamber, and an open position. In the closed position, the retractable member is retracted, while, in the open position, the retractable member forms a stop abutment for the lower end of a wrap-around label inserted into the chamber. The retractable member may be retracted automatically by means of cam surfaces correctly arranged between the main body of the chamber and the moving end-wall part. In addition, it may be necessary to provide a spring or the like so that, in the open position, the retractable member is caused to project into the thermoforming chamber. That device is also satisfactory, but it also has a relatively complex mechanism, and it requires high-precision manufacturing in order to ensure that the retractable member retracts properly.

The two above-mentioned prior devices offer the advantage of enabling a receptacle to be manufactured that is free of any shoulder at the lower edge of the wrap-around label, i.e. the edge of the wrap-around label that faces towards the end-wall of the receptacle. Beyond the aspect of merely being of unpleasing appearance, the presence of such a shoulder can cause the receptacle to have zones of weakness if the thermoplastic material does not stretch appropriately in the zone of the shoulder during manufacture of the receptacle.

An object of the present description is to propose a device that also makes it possible to manufacture receptacles provided with wrap-around labels and substantially free of shoulders at the lower edges of the wrap-around labels, the device substantially overcoming the drawbacks mentioned above with regard to the prior art device.

This object is achieved by the fact that the end-wall is suitable for moving in an end segment of the chamber between a positioning high level and at least one thermoforming low level, and the device has at least one tongue-and-groove set comprising a fin on the end-wall that is engaged in a notch in the inside surface of the end segment.

This device is extremely simple, in terms both of its structure and of its mechanism. Firstly, moving the end-wall between the high and low levels is simple from the points of view of the mechanism and of the structures of the parts in question. Secondly, it is not necessary to provide specific members that retract in the thermoforming position, thereby avoiding complicating the structure. It is the fin that carries the lower edge of the wrap-around label so that, when the end-wall reaches the positioning high level, the wrap-around label is placed in the desired position. When the end-wall is at the thermoforming low level, the notch in the inside surface of the end segment is uncovered, and the thermoplastic material therefore comes to press against its edge flush with the wall of the chamber. It is merely a notch into which it is unnecessary for the thermoplastic material to penetrate, or at least into which it is unnecessary to seek to control to any particular extent the deformation of the thermoplastic material, so that the presence of the notch, unlike the presence of a shoulder, does not induce any zones of weakness in the bodies of the receptacles thermoformed by means of the device. On the contrary, if thermoplastic material does penetrate into the notch (es), the resulting ribs reinforce the receptacles. This applies particularly when the notch and the groove are strictly parallel to the thermoforming direction, in which case the movement of the end-wall between the positioning high level and the thermoforming low level(s) is merely a movement in translation parallel to the thermoforming direction.

When the end-wall is at its positioning high level, it defines an abutment for the lower edge of a wrap-around label placed in the thermoforming chamber, so that said wrap-around label can be placed in a well-defined position, with a view to performing the thermoforming.

Provision may be made for the device to be equipped with means for holding the wrap-around label in said defined position. Thus, optionally, the inside surface of the chamber includes a suction portion situated between the high level and the axial opening. The suction may be implemented while the wrap-around label is in its defined position, in such a manner as to hold said wrap-around label in place for the thermoforming.

Once the wrap-around label is positioned in this way, the end-wall is moved to be brought to the thermoforming low level, thus making it possible to thermoform a receptacle without any shoulder at the lower edge of the wrap-around label.

Optionally, the notch ends at the high level.

Thus, the high level may be merely defined by the fin coming into abutment against then upper edge of the notch.

Optionally, the inside surface of the end segment of the chamber has diametrical dimensions that are larger at the high level than at the low level, and the depth of the notch, as measured transversely, is smaller at the high level than at the low level.

Thus, the invention is compatible with manufacture of a receptacle in which the side wall is curved or flares going from the end-wall upwards, to the lower edge of the wrap-around label.

Optionally, the fin projects transversely from an outline of the end-wall having diametrical dimensions that are analogous to the diametrical dimensions of the inside surface of the low level of the end segment in which the notch is formed.

Thus, when the end-wall of the thermoforming chamber is at the above-mentioned low level, the inside surface of the thermoforming chamber fits substantially snugly over the outline of said end-wall. The notch is uncovered over the inside surface of the chamber, and can form a discreet mark on the wall of the receptacle, in the vicinity of its end-wall.

Optionally, the device has a plurality of tongue-and-groove sets distributed circumferentially.

Each tongue-and-groove set comprises at least one fin and one notch, and the fins of the various sets are distributed circumferentially, in such a manner that, when the end-wall is moved towards the positioning level, said fins can carry a wrap-around label without it losing its angular positioning parallel to the axis of the thermoforming chamber.

Optionally, the tongue-and-groove set comprises a multiplicity of fins distributed uniformly over the circumference of the end-wall and engaged in a multiplicity of notches distributed uniformly over the inside surface of the end segment.

This configuration offers the above-mentioned advantage with regard to the plurality of tongue-and-groove sets distributed circumferentially. It enables the wrap-around label to be guided effectively while it is being positioned, by minimizing the clearance between the end-wall and the inside surface of the thermoforming chamber.

Optionally, the end-wall is suitable for taking up a plurality of thermoforming low levels, for thermoforming receptacles of different depths.

It is thus possible to thermoform receptacles of different capacities using the same device. In particular, it is possible to provide a single positioning high level, and a plurality of thermoforming low levels, the receptacles thermoformed at the various thermoforming low levels having different heights between the lower edge of the wrap-around label and the end-wall of the receptacle. By providing a plurality of thermoforming low levels for a device having a multiplicity of fins engaged in a multiplicity of notches that are distributed uniformly, these different receptacle depths are compatible with the fact that the lower portion of the wall of the receptacle is curved or flared. In such a situation, when the low level used for thermoforming is spaced significantly apart from the positioning level, the notches are uncovered over a height corresponding to that spacing, and simply form discreet marks on the lower portions of the walls of the receptacles.

For example, the thickness of a fin lies in the range 0.3 millimeters (mm) to 1 mm, and is preferably substantially equal to 0.5 mm, and the width of a notch receiving said fin is equal to the thickness of the fin, plus clearance of approximately in the range 0.1 mm to 0.3 mm, and preferably substantially equal to 0.2 mm.

By using a conventional thermoforming material, e.g. polystyrene (PS), polypropylene (PP), or polyethylene terephthalate (PET), and thermoforming pressures and temperatures that are also conventional, e.g. a pressure of from 3 to 6 bars, and a temperature of from 120° C. to 170° C. depending on the thermoplastic material chosen, these fin and notch dimensions make it possible to obtain the above-mentioned advantages without thermoplastic material penetrating significantly into the notches.

The description also provides a method of manufacturing receptacles provided with decorative wrap-around labels by thermoforming, by using a mold block including a thermoforming chamber having an inside surface, an axial opening, and a moving end-wall opposite from the opening, which method comprises pushing a decorative wrap-around label into the thermoforming chamber through said axial opening, and thermoforming a receptacle in the thermoforming chamber by pushing a thermoplastic material into said chamber via said axial opening.

An object of the present description is to propose a method that also makes it possible to manufacture receptacles provided with wrap-around labels and substantially free of shoulders at the lower edges of the wrap-around labels, the method substantially overcoming the drawbacks mentioned above with regard to the prior art devices and to implementing them.

This object is achieved by the fact that, prior to thermoforming the receptacle in the thermoforming chamber, the method further comprises placing the end-wall at a positioning high level in an end segment of the chamber in such a manner as to position the wrap-around label in the thermoforming chamber by causing the wrap-around label to co-operate with at least one fin on the end-wall that is engaged in a notch in the inside surface of the end segment, and then placing the end-wall at a thermoforming low level for thermoforming the receptacle.

Optionally, prior to thermoforming the receptacle in the thermoforming chamber, the method further comprises placing the end-wall at a retracted low level, pushing the decorative wrap-around label into the thermoforming chamber through said axial opening until the edge of the wrap-around label that is facing towards the end-wall reaches the level of the fin, and then moving the end-wall by bringing it to the positioning high level in such a manner as to position the wrap-around label in the thermoforming chamber.

Optionally, after positioning the decorative wrap-around label, the method further comprises holding the wrap-around label in position against the inside surface of the thermoforming chamber, in particular by suction.

Optionally, the method further comprises placing the end-wall at various different thermoforming low levels, for thermoforming receptacles that are of different depths.

The description also provides a thermoformed receptacle having a body with an axial wall surrounded by a wrap-around label, an axial opening, and an end-wall connected to the axial wall via an end portion that extends between the end-wall and the edge of the wrap-around label that faces towards the end-wall, in which receptacle the end portion has at least one rib that ends at the edge of the wrap-around label that faces towards the end-wall, and said rib is connected to the axial wall without any shoulder.

This receptacle is of the type that can be manufactured by means of the device of the invention. It offers the advantage of not having any shoulder at the lower edge of the wrap-around label that faces towards the end-wall, and it merely has at least one rib, corresponding to the "at least one fin" of the device of the invention, which rib is hardly visible and does not constitute any zone of weakness for the receptacle. Naturally, the number of ribs corresponds to the number of notches of the thermoforming chamber and, in particular, when the tongue-and-groove set comprises a multiplicity of fins and a multiplicity of notches distributed uniformly, the end portion of the receptacle manufactured in said chamber has, itself, a multiplicity of ribs distributed uniformly, and corresponding to the fins. In particular, the ribs extend along the vertical axis of the receptacle.

Optionally, the end portion has diametrical dimensions at the junction where it meets the end-wall that are less than its diametrical dimensions at the edge of the wrap-around label that faces towards the end-wall.

Optionally, the end portion has a plurality of ribs distributed circumferentially.

The invention can be well understood and its advantages appear more clearly on reading the following detailed description of an embodiment that is shown by way of non-limiting example. This description refers to the accompanying drawings, in which.

Figure 2:
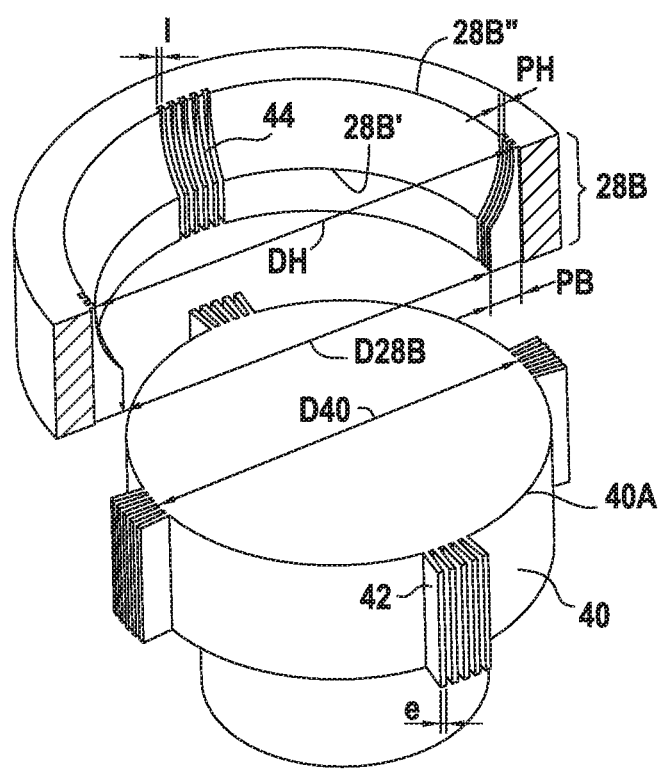
FIG. 2 is a fragmentary perspective view of the end segment of a thermoforming chamber (with a cut-away view of a portion of the axial wall of the chamber) and of its end-wall.
Figure 3:
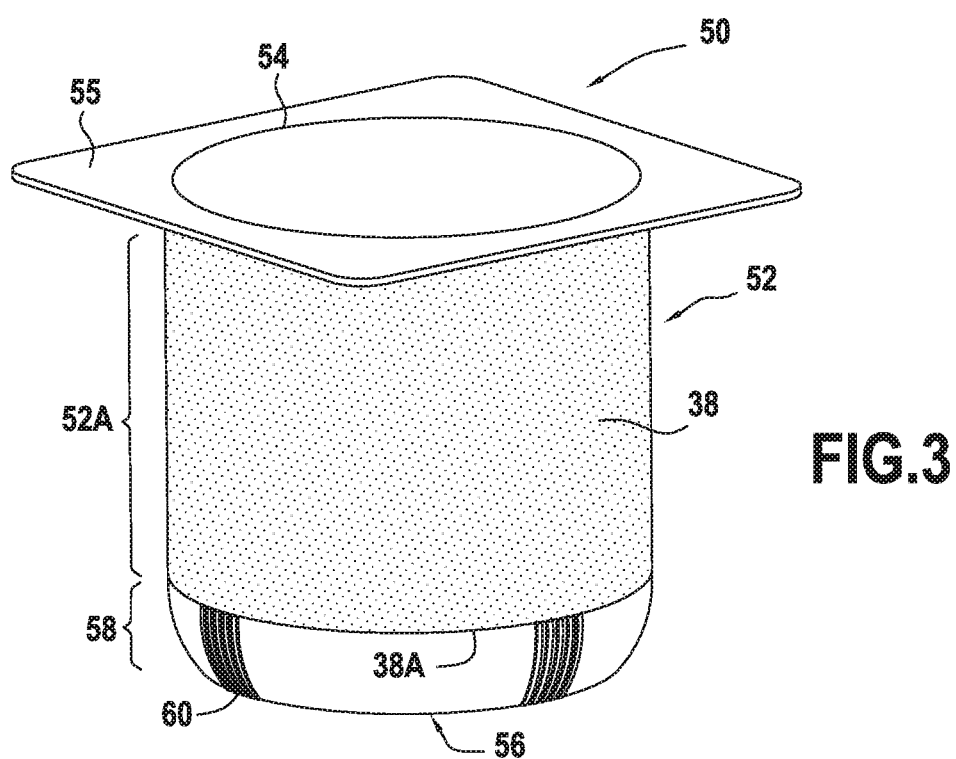
Figure 2C:
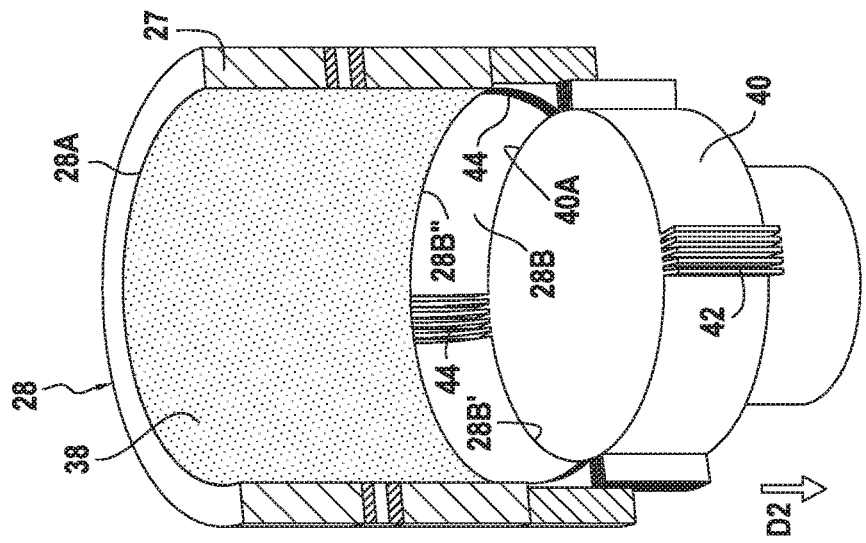
Figure 2B:
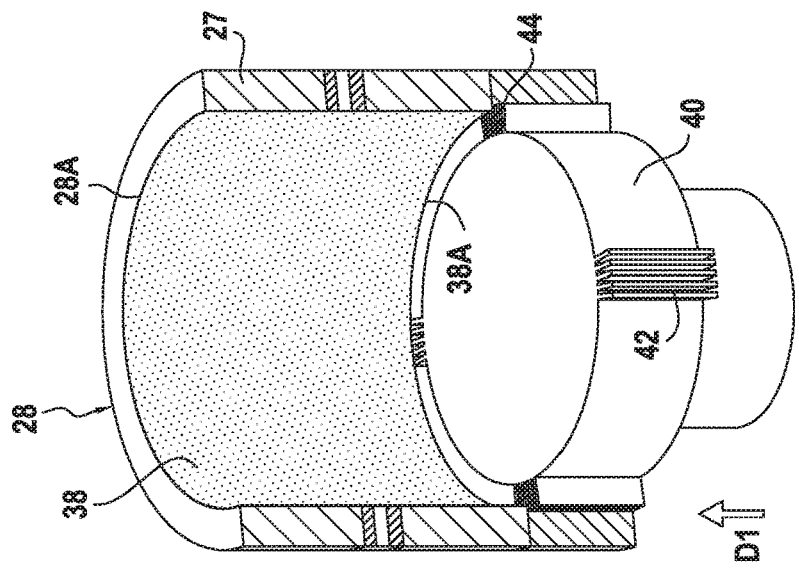
Figure 2A:
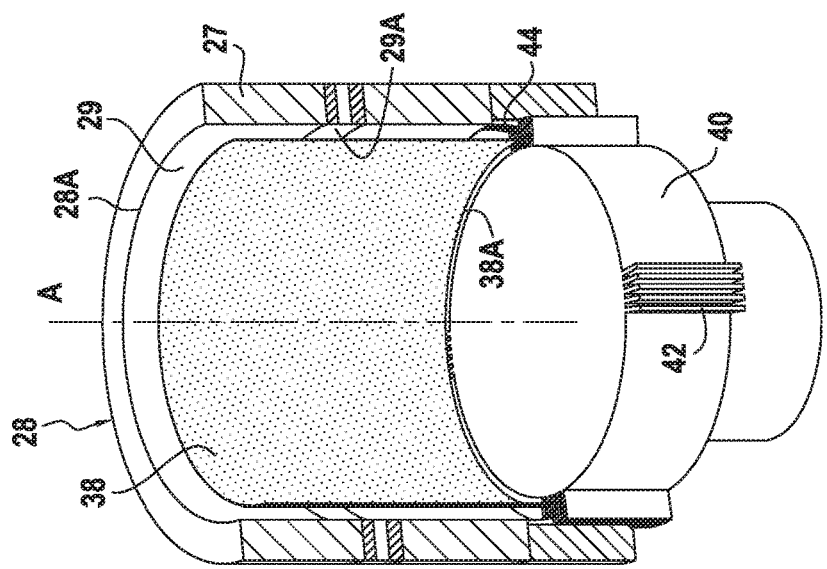
Figure 4D:
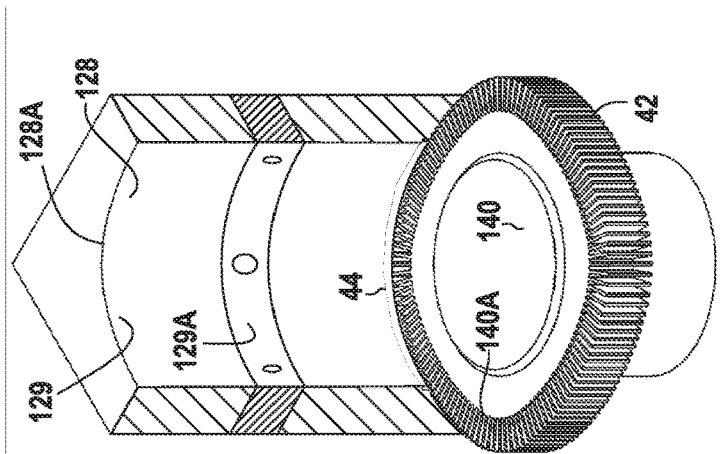
Figure 4C:
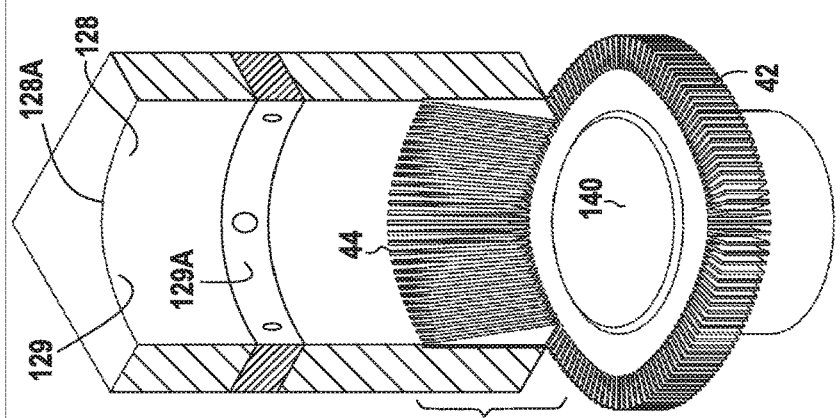
Figure 4B:
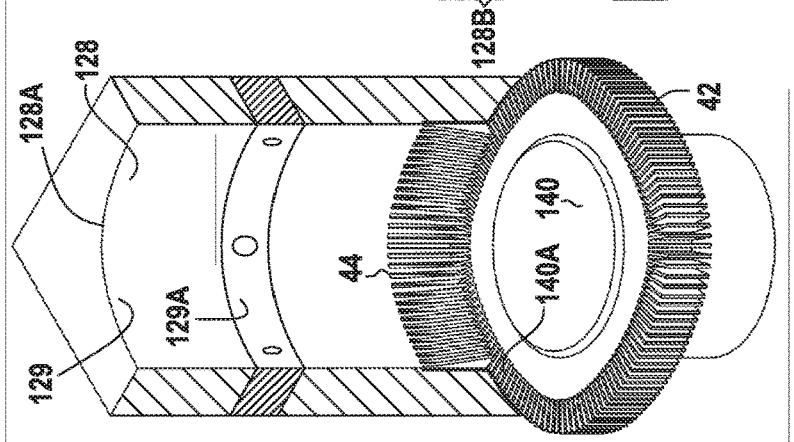
Figure 4A:
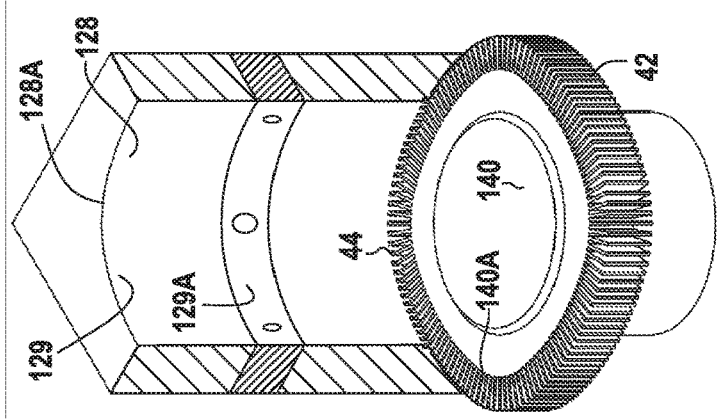
Figure 5C:
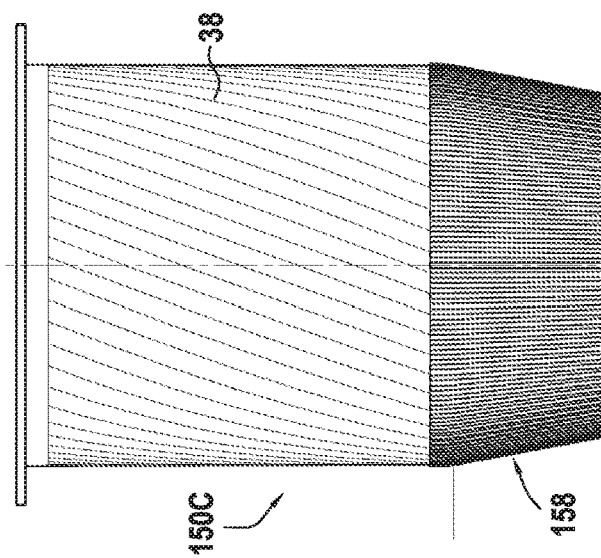
Figure 5B:
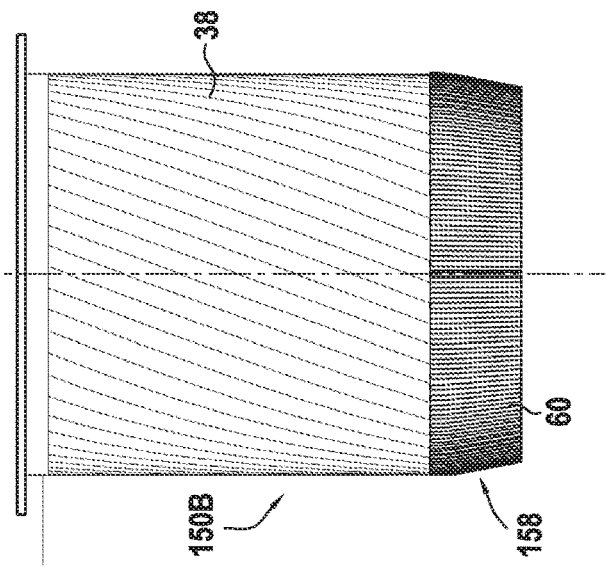
Figure 5A:
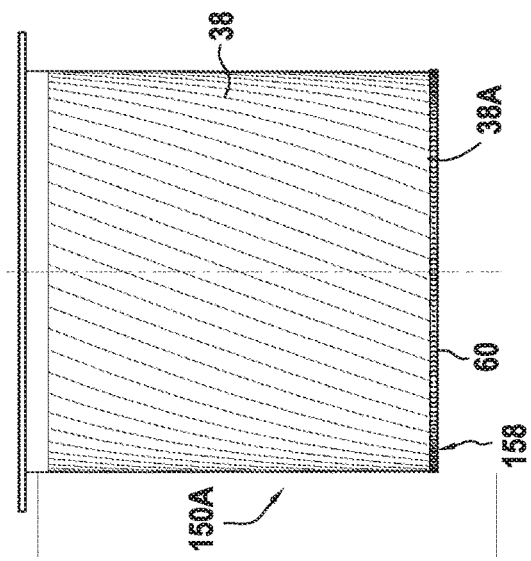

FIGS. 2A, 2B, and 2C are fragmentary axial section views showing the shape of a thermoforming chamber of a device of the invention, for three positions of the moving end-wall of said chamber;

FIG. 3 is a perspective view showing a receptacle obtained by means of the device of the invention;

FIGS. 4A, 4B, 4C, and 4D are fragmentary axial section views of a thermoforming chamber of a device of the invention, in a variant embodiment, FIGS. 4A, 4B, and 4C showing the end-wall at various thermoforming low levels, and FIG. 4D showing the end-wall at the positioning high level; and FIGS. 5A, 5B, and 5C show receptacles obtained using the thermoforming chamber of the variant embodiment, for respective ones of the thermoforming low levels shown in FIGS. 4A, 4B, and 4C.

Figure 1:
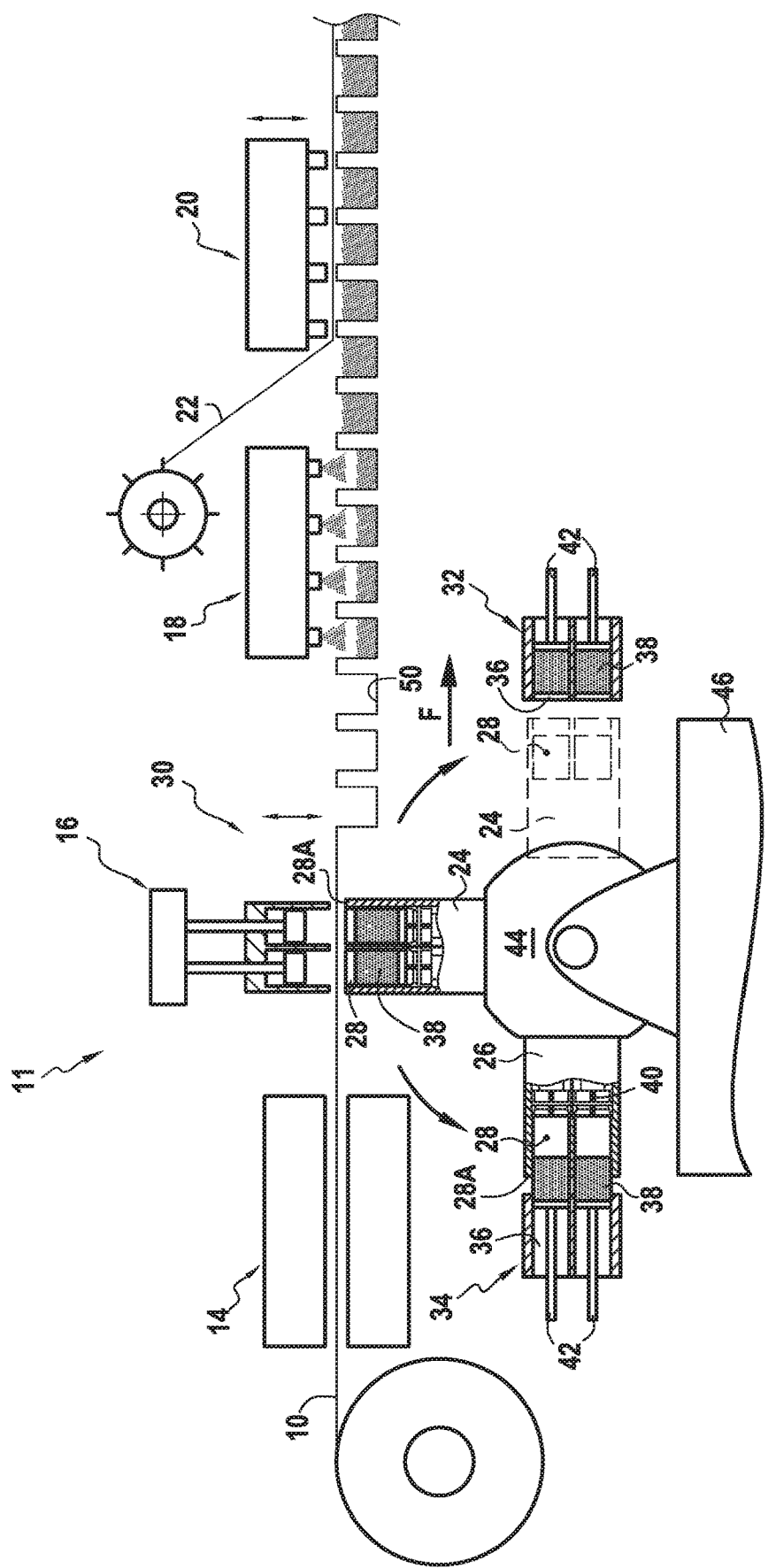
FIG. 1 is an overall view of an installation for thermoforming, filling, and sealing receptacles, which installation includes a device of the invention.

The installation shown in FIG. 1 includes a plurality of stations through which a strip 10 of thermoplastic material is driven stepwise by drive means (not shown). Considered in succession in the advance direction F in which the strip advances, the installation comprises a heater station 14, a thermoforming station 16, a filler station 18 for filling the thermoformed receptacles 50, and a closure station 20 for closing the receptacles 50 by sealing a closure strip 22 across their openings.

Naturally, the invention may also apply to thermoforming receptacles of a thermoplastic material in a form other than in the form of a continuous strip, e.g. in the form of individual wafers or tokens, from each of which a receptacle or a group of receptacles are thermoformed. In addition, the installation may be an installation that performs thermoforming only, without filling or closing the receptacles. Furthermore, the closure may be performed by means other than those that are shown for station 20.

The thermoforming station 16 shown includes two mold blocks 24, 26, each of which has a plurality of thermoforming chambers 28. The thermoforming station 16 also includes a block of thermoforming pistons 30, each piston being movable in a thermoforming chamber, and insertion means for inserting decorative wrap-around labels into the thermoforming chambers. In this example, said insertion means comprise two blocks 32 and 34 of insertion chambers 26 for inserting decorative wrap-around labels 38, these blocks 32 and 34 preferably being angularly positioned to extend in the advance direction in which the strip 10 advances.

In this example, the thermoforming pistons 30 are suitable for moving only in a direction perpendicular to the advance direction F, i.e. in a vertical direction, since the advance direction is horizontal. In the example shown, each mold block is associated with a respective insertion block 32 or 34.

In this example, the mold blocks 24 and 26 are angularly positioned at 90° relative to each other, and they are carried by a rotary drum 44, of horizontal axis perpendicular to the advance direction F, and mounted on a support 46. Thus, in FIG. 1, the mold block 24 is in a thermoforming position, its thermoforming chambers 28 being aligned with the pistons 30, while the mold block 26 is in a wrap-around label insertion position. The wrap-around label insertion blocks 32 and 34 are disposed on either side of the drum 44, so that the thermoforming chambers of the block 26 are aligned with the chambers 36 of the block 34 when the block 24 is in the thermoforming position, and so that the thermoforming chambers 28 of the block 24 are aligned with the chambers 36 of the block 32 when it is the mold block 26 that is in the thermoforming position.

In the situation shown in FIG. 1, as indicated above, it is the mold block 26 that is in the wrap-around label insertion position. The chambers 28 are aligned with the chambers 36 of the block 34, and the wrap-around labels 38 have already been placed in said chambers 36. Pistons 42 mounted to move in the chambers 36 then push the wrap-around labels into the chambers 28 of the mold block 26, through the axial openings 28A of said chambers 28.

Dashed lines show the position that the mold block 24 takes up in the wrap-around label insertion position, in which its thermoforming chambers 28 are aligned with the chambers 26 of the insertion block 32, in such a manner as to enable wrap-around labels to be inserted through the openings 28A of the chambers 28.

Even though it is diagrammatic, it can also be seen in FIG. 1 that the thermoforming chambers 28 of the mold blocks 24 and 26 have moving end-walls 40. It can be understood that these end-walls are mounted to move in reciprocating translation parallel to the direction of the axes of the thermoforming chambers, this direction being respectively vertical when the mold block in question is in the thermoforming position, and horizontal when said mold block is in the wrap-around label insertion position. Thus, when the mold block 24 or 26 is in its thermoforming position, the direction in which the end-walls of its chambers move is parallel to the thermoforming direction, which is the direction in which the pistons 30 move and also the direction in which the mold block assembly moves between a thermoforming high position, and an unmolding low position in which the thermoformed receptacles are unmolded.

In the example shown in FIG. 1, two mold blocks angularly positioned at 90° relative to each other are shown. Naturally, it is possible to use another configuration and, for example, to have a single mold block only, or, conversely, to have more than two mold blocks, as shown in European Patent Application No. 1 836 040. In addition, the use of one or more pivotally mounted mold blocks facilitates inserting the wrap-around labels into the chambers, via the same opening as the opening through which the thermoforming piston passes. However, it is possible to imagine a different system, e.g. one or more mold blocks that are mounted to move in translation so as to move away from the path of the strip, in order to enable the wrap-around labels to be put in place in the thermoforming chambers, and so as then to return under the thermoforming pistons.

The shape of a thermoforming chamber can be better understood on the basis of FIGS. 2A to 2C. These FIGS. show a chamber 28, with its moving end-wall 40, a portion of the wall 27 of the chamber 28 being cut-away. A wrap-around label 38 is present in the chamber, and is placed against its inside surface 29. It can be seen in these FIGS., and also in FIG. 2, that the chamber 28 includes tongue-and-groove sets, each comprising fins 42 formed on the outside periphery of the end-wall 40, and notches 44 formed in the inside surface of an end segment 28B of the chamber 28 that is adjacent to the end-wall, i.e. that is opposite from the axial opening 28A of the chamber through which the wrap-around label 28 has been inserted into the chamber.

FIG. 2 shows, in exploded perspective, merely the end-wall 40 of the chamber and the end segment 28B of said chamber, in which segment the notch 44 extends. In the embodiment shown, a plurality of tongue-and-groove sets (in this example, 4 tongue-and-groove sets) are distributed circumferentially. In this example, each of these sets comprises five fins 42 disposed on the outside periphery of the end-wall 40, and five notches 44 disposed in the inside periphery of the chamber, in its end segment 28B. These sets are distributed uniformly, and are therefore spaced apart from one another by about 90°. It can be seen that the fins project transversely from an outline 40A of the end-wall 40 whose diametrical dimensions D40 are analogous to the diametrical dimensions D28B of the inside surface of the low level of the end segment 28B. It can also be seen that the diametrical dimensions DH of the inside surface of the end segment 28B at the high level 28B" are greater than its diametrical dimensions D28B at the low level 28B'. It can also be seen that the depth PB of the notches at the low level is greater than their depth PH at the high level. These depths are measured transversely, i.e. perpendicularly to the axis A of the chamber, which axis is also the axis along which the end-wall 40 moves in transverse translation, and the axis along which the thermoforming pistons 30 move when the chamber is the thermoforming position. The thickness $e$ of a fin 42, as measured circumferentially, lies in the range 0.3 mm to 1 mm, and is preferably substantially equal to 0.5 mm. The width $l$ of a notch 44, also measured circumferentially, is equal to the thickness of the fin, plus clearance of approximately in the range 0.1 mm to 0.3 mm, and preferably substantially equal to 0.2 mm.

The inside surface of the chamber 28 includes a suction portion 29A situated between the high level and the axial opening 28A. In known manner, this portion is provided with suction orifices provided in the wall of the chamber and connected to a suction source. This suction portion serves to press the wrap-around label against the inside surface of the chamber, once the wrap-around label is in position.

The manner in which the position of the wrap-around label 38 is adjusted in the chamber 28 is described below with reference to FIGS. 2A to 2C. In FIG. 2A, the end-wall 40 is at a retracted low level, and the wrap-around label 38 has just been inserted in the chamber 28, e.g. by being pushed by a piston 42 of the type described with reference to FIG. 1. Thus, the lower edge 38A of the wrap-around label 38 is bearing against the fins 42. Then, the end-wall 40 is moved towards the opening 28A of the chamber 28 as indicated by arrow D1 of FIG. 2B, until it reaches its positioning high level.

Whereupon, the lower edge 38A of the wrap-around label, carried by the fins, is placed at the desired level. It can be seen that this positioning high level is the level at which the notches 44 end. In other words, this high level is defined by the upper edges of the notches 44, against which edges the fins come into abutment. While the wrap-around label is thus correctly put in place, it may be held against the inside surface 29 of the thermoforming chamber 28 by any known means, e.g. by the above-mentioned suction portion 29A.

The end-wall 40 can then move back down in the direction indicated by arrow D2 shown in FIG. 2C, while moving away from the opening 28A of the chamber 28, to reach the thermoforming low level. It is in this position that it is shown in FIG. 2C. In this position, insofar as, as indicated above, the outline 40A of the end-wall from which outline the fins 42 extend has diametrical dimensions corresponding to the diametrical dimensions of the low level 28B' of the chamber, there is practically no gap (ignoring working tolerances) between the end-wall 40 and the inside surface 29 of the chamber, thereby making it possible to achieve thermoforming without any zone of weakness.

The wrap-around label 38 fits snugly over the inside surface of the chamber 28, without any shoulder. However, the notches 44 present in the end segment 28B can be partially penetrated by thermoplastic material, which can cause the presence of ribs on the end portions of the receptacles thermoformed in the chamber.

FIG. 3 shows such a receptacle 50 that has a body 52 with an axial wall 52A surrounded by a wrap-around label 38, an axial opening 54, which, in this example, is edged by a rim 55 onto which a lid or a closure film can be sealed, and an end wall 56 connected to the axial wall via an end portion 58 that extends between the end-wall and the lower edge 38A of the wrap-around label 38, which lower edge faces towards the end-wall 56. It can be seen that the end portion 58 has at least one rib 60 that ends at the lower edge 38A of the wrap-around label 38, and that is connected to the axial wall 52A without any shoulder. In this example, this receptacle has been thermoformed in the above-described chamber, so that its end portion 58 has a plurality of groups of ribs 60 corresponding to the various groups of fins 44 described above. It can be seen that the end portion 58 has diametrical dimensions at the junction where it meets the end-wall 56 that are less than its diametrical dimensions at the lower edge 38A of the wrap-around label.

It is indicated that the ribs 60 are connected to the axial wall of the receptacle without any shoulder. This means that, at the lower edge 38A of the wrap-around label 38, the outside face of the rib is at the same diametrical dimensions as the outside face of the wrap-around label. Naturally, in the setbacks defined between the ribs, small shoulders can exists, but, in any event, they are very small, and, in reality, hardly perceptible since the depth PH of the notches 44 in the wall of the thermoforming chamber is very small at the positioning high level. It is not sought to have the thermoplastic material penetrate into the notches, and so provision is made to avoid strongly locally drawing the thermoplastic material, and thus to avoid locally weakening the wall of the receptacle.

In the above-described FIGS., the chamber 28 and therefore the body of the receptacle are substantially cylindrical with circular bases (except, possibly, for the flared shape of the end segment of the chamber and of the end portion of the body of the receptacle). Naturally, provision may be made to have other shapes, and in particular cylindrical shapes that have non-circular bases, e.g. oval bases or square bases with rounded corners.

FIGS. 4A to 4D are described below. They show a portion of a thermoforming chamber, in views analogous to those of FIGS. 2A to 2C, but the variant shown differs from the one described above with reference to those FIGS. by the fact that the tongue-and-groove set comprises a multiplicity of fins 42 distributed uniformly over the circumference 140A of the end-wall 140 and engaged in a multiplicity of notches 44 that are also distributed uniformly, over the inside surface of the end segment 128B of the chamber 128. The thicknesses of the fins and the widths of the notches may be of the same order of magnitude as indicated above. Over the outline 140A of the end-wall 140, the fins form a uniformly toothed ring and they engage in the notches that themselves form a uniform set of teeth over the outline of the inside surface of the end portion 128B of the chamber 128. As in the above-described example, the inside surface 128 of the chamber 128 may have a suction portion 129A provided with suction orifices. With this variant, the end-wall 140 can take up a plurality of thermoforming low levels. Since the fins and the notches are distributed uniformly, regardless of the level taken up by the end-wall in the end segment 128B, the gaps between the inside surface of the chamber and the outline of the end-wall are small, so that the thermoforming can take place without any difficulty, without undesired penetration of material into a zone that is not designed for that purpose, and also without creating any zone of weakening in the thermoformed receptacles.

Thus, FIGS. 4A, 4B, and 4C show respective ones of three thermoforming low levels, namely, for FIG. 4A a level closer to the axial opening 128A of the chamber, for FIG. 4B an intermediate level, and, for FIG. 4C a level further away from the opening 128A.

FIG. 4D shows the end-wall at the positioning high level, in which it can be seen that the fins 42 are in abutment against the upper edges of the notches 44.

FIGS. 5A to 5C show the receptacles obtained in the various positions shown in FIGS. 4A, 4B, and 4C. On the receptacle 150A in FIG. 5A, the ribs 60 are hardly perceptible under the lower edge 38A of the wrap-around label 38, the end portion 158 of the body of the receptacle being of very low height. On the receptacle 150B of FIG. 5B, the ribs 60 are more perceptible, the end portion 158 of the body of the receptacle having a relatively significant height unlike the height of the receptacle 150A. Finally, in FIG. 5C, the height of the end segment 158 of the receptacle 150C is even more significant, and the ribs 60 are therefore more visible. It can thus be understood that it is possible, using the same device, to manufacture receptacles of different capacities, i.e. receptacles having the same outline, but having bodies that are increasingly deep.

In this example, as in the embodiment shown in FIGS. 2A to 2C, the end segment 128B of the chamber has diametrical dimensions that decrease going away from the axial opening of said chamber. Thus, the walls of the receptacles 150B and 150C slope in their end portions 158. It should however be noted that this is not essential, and that the end segment 128B could have diametrical dimensions, as defined by the outer edges of the notches (which, considered together, define the inside surface of the end segment of the chamber), that are analogous to the diametrical dimensions of the remainder of the chamber, and that lie on a cylinder. In which case, a plurality of thermoforming low levels could be imagined, even if one or more tongue-and-groove sets of the type of those shown in FIG. 2 (without uniform distribution of a multiplicity of notches and of fins) were provided.

The retracted level of the end-wall 40 shown in FIG. 2A or of the end-wall 140 is advantageously situated vey slightly below the positioning high level. For example, when the end-wall is in this retracted position, only a small height of notch is uncovered at the inside periphery of the chamber, e.g. approximately in the range 1 mm to 3 mm of height of notch. Thus, and in particular when the diametrical dimensions of the end segment of the chamber decrease going away from the axial opening of the chamber, the lower edge of the wrap-around label rests, when the end-wall is at its retracted level, on a surface defining an outline that is substantially equal to its diametrical dimensions.

The invention claimed is:

1. A device for manufacturing receptacles provided with decorative wrap-around labels by thermoforming, the device including a mold block having at least one thermoforming chamber that has a side wall defining an inside surface, an axial opening, and a moving end-wall, opposite from the opening, and a wrap-around label insertion block having at least one wrap-around label insertion chamber and a piston mounted to move in the wrap-around label insertion chamber to push a decorative wrap-around label into the thermoforming chamber through said axial opening, the moving end-wall being configured to move along the inside surface in an end segment of the chamber between a positioning high level in which said moving end wall is configured to define an abutment for a lower edge of a wrap-around label placed in the thermoforming chamber and at least one thermoforming low level, and the device comprising at least one tongue-and-groove set comprising a fin on the end-wall, said fin being engaged in a notch in the inside surface of the end segment.

2. A device according to claim 1, wherein the notch ends at the high level.

3. A device according to claim 1, wherein the inside surface of the end segment of the chamber has diametrical dimensions that are larger at the high level than at the low level, and the depth of the notch, as measured transversely, is smaller at the high level than at the low level.

4. A device according to claim 1, wherein the fin projects transversely from an outline of the end-wall having diametrical dimensions that are analogous to the diametrical dimensions of the inside surface of the low level of the end segment in which the notch is formed.

5. A device according to claim 1, comprising a plurality of tongue-and-groove sets distributed circumferentially.

6. A device according to claim 1, wherein the tongue-and-groove set comprises a multiplicity of fins distributed uniformly over the circumference of the end-wall and engaged in a multiplicity of notches distributed uniformly over the inside surface of the end segment.

7. A device according to claim 1, wherein the end-wall is suitable for taking up a plurality of thermoforming low levels, for thermoforming receptacles that are of different depths.

8. A device according to claim 1, wherein the thickness of a fin lies in the range 0.3 mm to 1 mm, and the width (13)

of a notch (44) receiving said fin is equal to the thickness of the fin, plus clearance of approximately in the range 0.1 mm to 0.3 mm.

9. A device according to claim 1, wherein the thickness of a fin is substantially equal to 0.5 mm, and the width of a notch receiving said fin is equal to the thickness of the fin, plus clearance substantially equal to 0.2 mm.

10. A device according to claim 1, wherein the inside surface of the chamber includes a suction portion situated between the high level and the axial opening.

* * * * *